(12) United States Patent  
Brown et al.

(10) Patent No.: US 7,423,427 B2
(45) Date of Patent: Sep. 9, 2008

(54) ARBITRARILY ACCURATE COMPOSITE PULSE SEQUENCES

(75) Inventors: Kenneth R. Brown, Cambridge, MA (US); Aram W. Harrow, East Lansing, MI (US); Issac L. Chuang, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/129,908

(22) Filed: May 16, 2005

(65) Prior Publication Data

US 2006/0010187 A1 Jan. 12, 2006

Related U.S. Application Data

(60) Provisional application No. 60/571,192, filed on May 14, 2004.

(51) Int. Cl.
*G01V 3/00* (2006.01)
(52) U.S. Cl. ..................................................... 324/307
(58) Field of Classification Search ......... 324/300–322; 702/1–84, 106–116, 123–127, 182–199
See application file for complete search history.

(56) References Cited

U.S. PATENT DOCUMENTS 4,940,940 A 7/1990 Leroux
5,153,515 A 10/1992 Leigh et al.
5,572,126 A 11/1996 Shimmar

OTHER PUBLICATIONS

Bennett, Charles H. et al., Quantum Information Theory, IEEE Transactions on Information Theory, Oct. 1998, pp. 2724-2742, vol. 44, No. 6.
Bollinger, J. J. et al., Optimal frequency measurements with maximally correlated states, Physical Review A, Dec. 1996, pp. R4649-R4652, vol. 54, No. 6.
Cummins, H. K. et al., Use of composite rotations to correct systematic errors in NMR quantum computation, New Journal of Physics, 2000, pp. 6.1-6.12, vol. 2, Publisher: Institute of Physics and Deutsche Physikalische Gesellschaft Journal.

(Continued)

*Primary Examiner*—Brij B. Shrivastav
*Assistant Examiner*—Dixomara Vargas
(74) *Attorney, Agent, or Firm*—Norma E. Henderson

(57) ABSTRACT

The present invention is a method for constructing fully-compensating composite pulses of arbitrary accuracy that can correct pulse power errors to any desired order. The invention has two preferred embodiments, the Trotter-Suzuki (TS) embodiment and the Solovay-Kitaev (SK) embodiment. Each preferred embodiment can be represented by a mathematical algorithm, which can be easily implemented on a computer, for constructing a list of phases $\{\phi_1, \ldots, \phi_j\}$ and rotation angles $\{\theta_1, \ldots, \theta_j\}$ that amounts to a composite pulse. The pulses can then be used for nuclear magnetic resonance, quantum computing, or any other application based on pulsed excitations. The present invention, as embodied in the pulse sequences SK n and TS n, allows the user to transform a pulse sequence of error $\epsilon$ to a robust pulse sequence with error $O(\epsilon^n)$ for arbitrary n. The sequences can be implemented using any existing quantum computer or NMR hardware.

24 Claims, 5 Drawing Sheets

OTHER PUBLICATIONS

Gottesman, Daniel, Theory of fault-tolerant quantum computation, Physical Review A, Jan. 1998, pp. 127-137, vol. 57, No. 1, Publisher: The American Physical Society.

Jones, Jonathan A., Robust Isling gates for practical quantum computation, Physical Review A, 2003, pp. 012317-1-012317-3, vol. 67, Publisher: The American Physical Society.

Knill, Emanuel et al., Theory of quantum-correcting error codes, Physical Review A, Jan. 1997, pp. 900-911, vol. 55, No. 2, Publisher: The American Physical Society.

Levitt, Malcolm H. et al., Composite Pulses Constructed by a Recursive Expansion Procedure, Journal of Magnetic Resonance, 1983, pp. 247-254, vol. 55.

Levitt, Malcolm H., Composite Pulses, Progress in NMR Spectroscopy, 1986, pp. 61-122, vol. 16.

Levitt, Malcolm H. et al., NMR Population Inversion Using a Composite Pulse, Journal of Magnetic Resonance, 1979, pp. 473-476, vol. 33.

McHugh, D. et al., 6th Order Robust Gates for Quantum Control, web publication, Nov. 12, 2004, pp. 1-5.

Riebe, M. et al., Deterministic quantum teleportation with atoms, Nature, Jun. 17, 2004, pp. 734-737, vol. 429.

Steane, A. M., Physical Review Letters, Physical Review Letters, Jul. 29, 1996, pp. 793-797, vol. 77, No. 5, Publisher: The American Physical Society.

Steane, Andrew, Quantum computing, Rep. Prog. Phys., 1998, pp. 117-173, vol. 61.

Suzuki, Masuo, General theory of higher-order decomposition of exponential operators and symplectic integrators, Physics Letters A, 1992, pp. 387-395, vol. 165.

Tycko, R., Broadband Population Inversion, Physical Review Letters, Aug. 29, 1983, pp. 775-777, vol. 51, No. 9, Publisher: The American Physical Society.

Wimperis, Stephen, Broadband, Narrowband, and Passband Composite Pulses for Use in Advanced NMR Experiments, Journal of Magnetic Rosonance, Series A, 1994, pp. 221-231, vol. 109.

ARBITRARILY ACCURATE COMPOSITE PULSE SEQUENCES

RELATED APPLICATIONS

This application claims priority to U.S. Provisional Application Ser. No. 60/571,192, filed May 14, 2004.

STATEMENT REGARDING FEDERALLY SPONSORED RESEARCH

This invention was made with U.S. government support under Grant Numbers DAAD19-01-1-06 and DAAD 19-03-1-0075. awarded by the Army. The government has certain rights in this invention.

FIELD OF THE INVENTION

This invention relates to the control of quantum systems and, in particular, to fully compensating composite pulses that can be used to correct systematic control errors.

BACKGROUND

Precise and complete control over closed quantum systems is a long-sought goal in atomic physics, molecular chemistry, condensed matter research, with fundamental implications for metrology [J. J. Bollinger, W. M. Itano, D. J. Wineland, and D. J. Heinzen, Phys. Rev. A 54, R4649, (1996); C. H. Bennett and P. W. Shor, IEEE Transactions on Information Theory, 44, 2724 (1998)] and computation [M. A. Nielsen and I. L. Chuang, Quantum Computation and Quantum Information (Cambridge University Press, Cambridge, UK, 2000); A. Steane, Rep. Prog. Phys. 61, 117 (1998)]. Achieving this goal will require careful compensation for errors of both random and systematic nature. While recent advances in quantum error correction [D. Gottesman, Phys. Rev. A 57, 127 (1998); A. M. Steane, Phys. Rev. Lett. 77, 793 (1996); E. Knill and R. Laflamme, Phys. Rev. A 55, 900 (1997), quant-ph/9604034] allows all such errors to be removed in principle, active error correction requires expanding the size of the quantum system, as well as feedback measurements that may be unavailable. Furthermore, in many systems, errors may be dominated by those of systematic nature, rather than by random errors, such as when the classical control apparatus is miscalibrated or suffers from inhomogeneities over the spatial extent of the target quantum system.

Such systematic errors are common in the art of nuclear magnetic resonance (NMR), where radio frequency fields (RF) applied to control nuclear spins in molecules often have pulse amplitude errors or are inhomogeneous across the sample. Of course, systematic errors can be reduced simply by calibration, but that is often impractical, especially when controlling large systems or when the required control error magnitude is smaller than what is easily measurable. Interestingly, however, systematic errors in controlling quantum systems can be compensated without specific knowledge of the magnitude of the error. This fact is lore [R. Freeman, Spin Choreography (Spektrum, Oxford, 1997)] in the art of NMR, and is achieved by using the method of composite pulses, in which a single imperfect pulse with fractional error E is replaced with a sequence of pulses, which reduces the error to $O(\epsilon^n)$.

Composite pulse sequences have been constructed to correct for a wide variety of systematic errors in NMR [R. Freeman, Spin Choreography (Spektrum, Oxford, 1997); M. Levitt and R. Freeman, J. Magn. Reson. 33, 473 (1979); R. Tycko, Phys. Rev. Lett. 51, 775 (1983)], including pulse amplitude, phase, and frequency errors. For example, in magnetic resonance imaging, composite pulse sequences can enhance frequency selectivity, and thereby increase the resolution with which spatial details can be distinguished. Generally, however, in NMR the goal is to maximize the measurable signal from a spin system that starts in a specific state. Thus, while composite sequences have been developed [M. Levitt and R. R. Ernst, J. Magn. Reson. 55, 247 (1983)] which can reduce errors to $O(\epsilon^n)$ for arbitrary n, these sequences are not general and do not apply, for example, to quantum computation, where the initial state is arbitrary and multiple operations must be cascaded in order to obtain desired multi-qubit transformations. Pulse sequences of this type have been previously patented, e.g. U.S. Pat. No. 5,153,515 ("Methods of generating pulses for selectively exciting frequencies"; Leigh et al) and U.S. Pat. No. 5,572,126 ("Reduced power selective excitation RF pulses"; Shinnar) [see also LeRoux "Method of radio-frequency excitation in an NMR experiment," U.S. Pat. No. 4,940,940, 1990].

Only a few composite pulse sequences are known which are fully compensating [M. Levitt, Prog. in NMR Spectr. 18, 61 (1986)], meaning that they work on any initial state and can replace a single pulse without further modification of other pulses. As has been theoretically discussed [H. Cummins and J. Jones, New J. Phys. 2.6, 1 (2000); J. Jones, Phys. Rev. A 67, 012317 (2002); D. McHugh and J. Tawnley, quant-ph/0404127 (2004)] and experimentally demonstrated [S. Gulde, M. Riebe, G. P. T. Lancaster, C. Becher, J. Eschner, H. Hffner, F. Schmidt-Kaler, I. L. Chuang, and R. Blatt, Nature 421, 48 (2003)], these sequences can be valuable for quantum computation and quantum information tasks, such as precise single and multiple-qubit control using gate voltages or laser excitation. However, these pulse sequences cannot currently be effectively used to compensate for errors of both random and systematic nature. What has been needed, therefore, are composite pulses that are both fully compensating and able to correct errors arbitrarily well.

SUMMARY

These and other objectives are met by the present invention, which is a system for producing composite pulses that are fully compensating, i.e. can replace a single pulse without further modification of the pulse sequence, and that can also correct pulse power errors to any desired order. Each method can be represented by a mathematical algorithm, which can be easily implemented on a computer, for constructing a list of phases $\{\phi_1, \ldots, \phi_j\}$ and rotation angles $\{\theta_1, \ldots, \theta_j\}$ that amounts to a composite pulse. The pulses can then be used for nuclear magnetic resonance, quantum computing, or any other application based on pulsed excitations. The composite pulses of the present invention can be implemented using the existing quantum computer or NMR hardware.

A composite pulse sequence $R_\phi^{[n]}(\theta)$ is a sequence of operations $\{M_{\phi_1}(\theta_1), \ldots, M_{\phi_j}(\theta_j)\}$ such that $R_\phi^{[n]}(\theta) = M_{\phi_1}(\theta_1) M_{\phi_2}(\theta_2) \ldots M_{\phi_j}(\theta_j) = R_\phi(\theta) + O(\epsilon^{n+1})$, for unknown error $\epsilon$. To construct $R_\phi^{[n]}(\theta)$, note that $R_\phi(-\theta\epsilon)M_\phi(\theta) = R_\phi(\theta)$ and $M_\phi(2k\pi) = \pm R_\phi(2k\pi\epsilon)$ when k is an integer. A composite pulse sequence can thus be obtained by finding ways to approximate $R_\phi(-\theta\epsilon)$ by a product of operators $R_{\phi_i}(2k_i 90 \epsilon)$. The first preferred embodiment of the present invention is the Trotter-Suzuki (TS) method. Suzuki has developed a set of Trotter formulas whereby, when given a Hermitian matrix B ($B_{ij}^* = B_{ji}$) and a series of Hermitian matrices $\{A_l\}$, such that $B = \Sigma A_l$, there exists a set of real numbers $\{p_{jn}\}$ such that $$\exp(-iBt) = \prod_{j,l} \exp(-ip_{jn}A_l t) + O(t^{n+1}),$$

and $\Sigma_j p_{jn} = 1$. Without loss of generality, this may be limited to expansions where the $p_{jn}$ are rational numbers and the assumption may be made that the goal is to approximate $R_0(-\theta\epsilon)$. Using Equation 2, set $t=\epsilon$ and $B=-(\theta/2)X$. Then choose $A_1 = A_3 = m\pi(X \cos \phi + Y \sin \phi)$ and $A_2 = 2m\pi(X \cos \phi - Y \sin \phi)$, where $\phi$ and $m$ fulfill the conditions that $4m\pi \cos \phi = \theta/2$ (i.e., $A_1 + A_2 + A_3 = B$) and $q_{jn} = p_{jn}m$ is an integer. This yields an n th order correction sequence $$F_n = \prod_j M_\phi(2\pi q_{jn}) M_{-\phi}(4\pi q_{jn}) M_\phi(2\pi q_{jn})$$
$$= R_0(-\theta\varepsilon) + O(\varepsilon^{n+1})$$
$$= R_0^{[n]}(-\theta\varepsilon)$$

and the associated n th order composite pulse sequence $F_n M_0(\theta) = R_0^{[n]}(-\theta\epsilon) R_0(\theta\epsilon) R_0(\theta) = R_0^{[n]}(\theta)$ thus giving a composite pulse sequence of arbitrary accuracy.

The second preferred embodiment of the present invention is the Solovay-Kitaev (SK) method. First, note that rotations $U_k(A) = I + A\epsilon^k + O(\epsilon^{k+1})$ can be constructed for arbitrary 2×2 Hermitian matrices A, and $k \geq 1$, recursively. This is done using an observation relating the commutator $[A,B] = AB - BA$ to a sequence of operations, $\exp(-iA\epsilon^l)\exp(-iB\epsilon^m)\exp(iA\epsilon^l)\exp(iB\epsilon^m) = \exp([A,B]\epsilon^{l+m}) + O(\epsilon^{l+m+1})$. Thus to generate $U_k(A)$, it suffices to generate $U_{\lceil k/2 \rceil}(B)$ and $U_{\lfloor k/2 \rfloor}(C)$, such that $[B,C] = A$. Choices of integers other than $\lceil k/2 \rceil$ and $\lfloor k/2 \rfloor$ which sum to k are also fine, but less optimal. Next, a composite pulse sequence $F_n$ for $R_0(\theta)$ is inductively constructed. Note that the first order correction sequence can be written as $F_1 = M_\phi(2\pi) M_{-\phi}(2\pi) = R_0(-\theta\epsilon) + O(\epsilon^2)$ by selecting $4\pi \cos(\phi) = \theta$. Assuming $F_n = R_0(-\theta\epsilon) - iA_{n+1}\epsilon^{n+1} + O(\epsilon^{n+2})$, a sequence may be constructed to correct for the next order, using $F_{n+1} = U_{n+1}(A_{n+1}) F_n$, where $U_{n+1}(A_{n+1})$ is constructed as above. Iteratively applying this method for $k=1, \ldots, n$ yields an n th order composite pulse sequence, $F_n M_0(\theta) = R_0^{[n]}(\theta)$, for any n.

DETAILED DESCRIPTION

The present invention is a method for constructing fully-compensating composite pulses that correct pulse power errors to any desired order. Previously these features have appeared only separately. Each method can be represented by a mathematical algorithm, which can be easily implemented on a computer, for constructing a list of phases $\{\phi_1, \ldots, \phi_l\}$ and rotation angles $\{\theta_1, \ldots, \theta_l\}$ that amounts to a composite pulse. The pulses can then be used for nuclear magnetic resonance, quantum computing, or any other application based on pulsed excitations. The present invention, as embodied in the pulse sequences SK n and TS n, allows the user to transform a pulse sequence of error $\epsilon$ to a robust pulse sequence with error $O(\epsilon^n)$ for arbitrary n. The sequences can be implemented using existing quantum computer or NMR hardware.

The present invention provides a method for effecting arbitrarily precise control over spin systems, using only an imperfect control apparatus. This is done without regard to the specific level of imperfection; aside from knowledge that the error is along a certain degree of freedom, such as amplitude or phase, no feedback or prior characterization of the systematic control imperfection is required. Instead, the method prescribes a sequence of control actions to be performed, such that the unknown imperfection cancels out, due to the inherent nature of quantum spin system dynamics. The length of the sequence determines the level of reduction of imperfection; the method provides a quantitative formula such that a sequence can be found to reduce the imperfection to any desired level.

Previously, the best fully compensating composite pulse sequence known [S. Wimperis, J. Magn. Reson. B 109, 221 (1994)] could only correct errors to $O(\epsilon^3)$. In H. Cummins and J. Jones, New J. Phys. 2.6, 1 (2000); J. Jones, Phys. Rev. A 67, 012317 (2002); and D. McHugh and J. Tawnley, quant-ph/0404127 (2004), the distance measure used is one minus the fidelity, $1 - \|V^\dagger U\|$ ("the infidelity") where $\|A\|$ is the norm of A. The present invention instead uses the trace distance, $\|V - U\|$, following the NMR community. Thus, the composite pulses of the present invention which are n th order in trace distance are 2n th order in infidelity. The present invention is a new, systematic technique for creating composite pulse sequences to correct errors to $O(\epsilon^n)$, for arbitrary n. The present invention has been implemented for the specific case of systematic amplitude errors, using two approaches. Also discussed is the number of pulses required as a function of n.

Figure 1A:
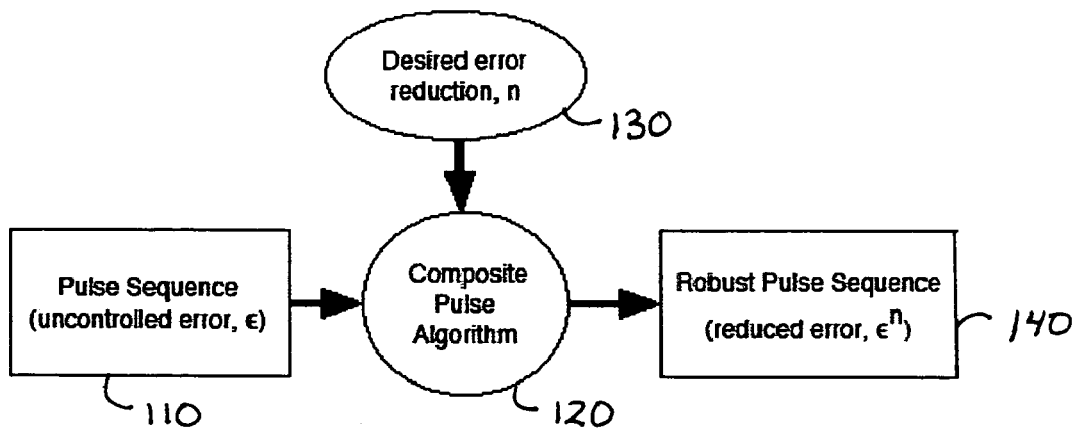
FIG. 1a illustrates the method of the present invention, in context.
Figure 1B:
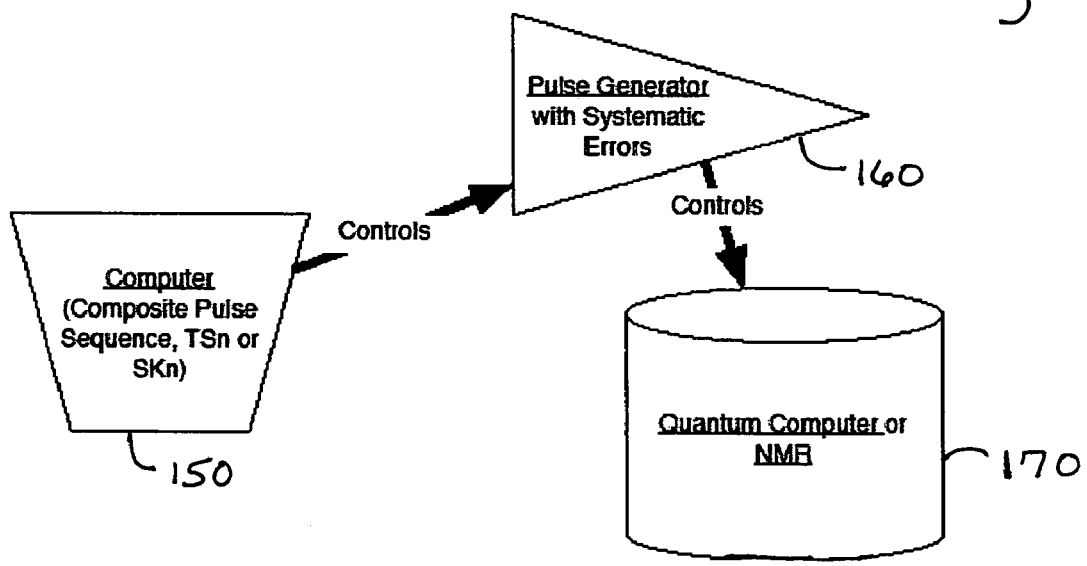
FIG. 1b illustrates an embodiment of an apparatus for implementing the present invention, in context.

These pulses perform the crucial function of transforming classical control with systematic error into arbitrarily accurate quantum control. Due to their fully compensating nature, any complex NMR sequence or quantum computing algorithm can substitute bare pulses with composite pulses without sequence modification. The role of composite pulses in these technologies is shown schematically in FIGS. 1a and 1b. As shown in FIG. 1a, pulse sequence 110 having uncontrolled error, $\epsilon$, is acted on by composite pulse algorithm 120 to achieve desired error reduction 130, n, producing robust pulse sequence 140 having reduced error, $\epsilon^n$. As seen in FIG. 1b, computer 150 produces a composite pulse sequence, TS n or SK n that controls pulse generator 160, correcting the generated pulses for systematic errors. The corrected pulses are then used to control quantum computer or NMR device 170.

The major application of the present invention is the reduction of control errors. As explained below, it is also possible to use this invention to enhance errors due to inhomogeneity. These narrowband composite pulses yield a new way to increase spatial resolution in magnetic resonance imaging. The problem of systematic amplitude errors is modeled by representing single qubit rotations as $$R_\phi(\theta) = \exp\left[-i\frac{\theta}{2}\sigma_\phi\right], \quad (1)$$

where $\theta$ is the desired rotation angle about the axis that makes the angle $\phi$ with the $\hat{x}$-axis and lies in the $\hat{x}$-$\hat{y}$ plane, $\sigma_\phi = \cos(\phi)X + \sin(\phi)Y$, and X and Y are two of the Pauli operators:

$$X = \begin{pmatrix} 0 & 1 \\ 1 & 0 \end{pmatrix}, Y = \begin{pmatrix} 0 & -i \\ i & 0 \end{pmatrix}, Z = \begin{pmatrix} 1 & 0 \\ 0 & -1 \end{pmatrix}$$

$R_\phi(\theta)$ is the ideal operation and, due to errors, the actual operation is, instead, $M_\phi(\theta) = R_\phi(\theta(1+\epsilon))$, where the angle of rotation differs from the desired $\theta$ by the factor $1+\epsilon$. Note that $\phi$ and $\theta$ may be specified arbitrarily, but the error $\epsilon$ is fixed for all operations, and unknown. An example of this sort of error is RF inhomogeneity in NMR; there it is still possible to precisely control the phase of the pulses, but their magnitude has spatial variations that cannot be corrected by calibration.

A composite pulse sequence $R_0^{[n]}(\theta)$ is a sequence of operations $\{M_{\phi_1}(\theta_1), \ldots, M_{\phi_l}(\theta_l)\}$ such that $R_\phi^{[n]}(\theta) = M_{\phi_1}(\theta_1) M_{\phi_2}(\theta_2) \ldots M_{\phi_l}(\theta_l) = R_\phi(\theta) + O(\epsilon^{n+1})$, for unknown error $\epsilon$. Note that AB to denotes three interchangeable operations depending on the interpretation: a) if A and B are 2×2 matrices, then AB denotes matrix multiplication; b) if A and B are power series of 2×2 matrices, $A = \Sigma_{n \geq 0} A_n \epsilon^n$, $B = \Sigma_{n \geq 0} B_n \epsilon^n$, then AB is the product of power series, $AB = \Sigma_{n \geq 0} (\Sigma_{k=0}^n A_k B_{n-k}) \epsilon^n$; c) if A and B are sequences of pulses, then AB represents their concatenation.

The present invention has two currently preferred embodiments, the Trotter-Suzuki embodiment and the Solovay-Kitaev embodiment. To construct $R_\phi^{[n]}(\theta)$, begin with two simple observations: first, $R_\phi(-\theta\epsilon)M_\phi(\theta) = R_\phi(\theta)$ and second, $M_\phi(2k\pi) = \pm R_\phi(2k\pi\epsilon)$ when k is an integer. A composite pulse sequence can thus be obtained by finding ways to approximate $R_\phi(-\theta\epsilon)$ by a product of operators $R_{\phi_j}(2k_j\pi\epsilon)$. In the preferred embodiments, this is obtained using one of two approaches.

The first preferred embodiment is the Trotter-Suzuki (TS) method. Suzuki has developed a set of Trotter formulas that when given a Hermitian matrix B ($B_{ij}^* = B_{ji}$) and a series of Hermitian matrices $\{A_l\}$, such that $B = \Sigma A_l$, there exists a set of real numbers $\{p_{jn}\}$ such that $$\exp(-iBt) = \prod_{j,l} \exp(-ip_{jn}A_l t) + O(t^{n+1}), \quad (2)$$

and $\Sigma_j p_{jn} = 1$ [M. Suzuki, Phys. Lett. A 165, 387 (1992)]. Without loss of generality, this may be limited to expansions where the $p_{jn}$ are rational numbers and the assumption may be made that the goal is to approximate $R_0(-\theta\epsilon)$. Using Equation 2, set $t = \epsilon$ and $B = -(\theta/2)X$. Then choose $A_1 = A_3 = m\pi(X \cos\phi + Y \sin\phi)$ and $A_2 = 2m\pi(X \cos\phi - Y \sin\phi)$, where $\phi$ and m fulfill the conditions that $4m\pi \cos\phi = \theta/2$ (i.e., $A_1 + A_2 + A_3 = B$) and $q_{jn} = p_{jn} m$ is an integer. This yields an n th order correction sequence $$F_n = \prod_j M_\phi(2\pi q_{jn}) M_{-\phi}(4\pi q_{jn}) M_\phi(2\pi q_{jn}) \quad (3)$$

$$= R_0(-\theta\epsilon) + O(\epsilon^{n+1})$$

$$= R_0^{[n]}(-\theta\epsilon)$$

and the associated n th order composite pulse sequence $F_n M_0(\theta) = R_0^{[n]}(-\theta\epsilon) R_0(\theta\epsilon) R_0(\theta) = R_0^{[n]}(\theta)$, thus giving a composite pulse sequence of arbitrary accuracy.

Figure 2:
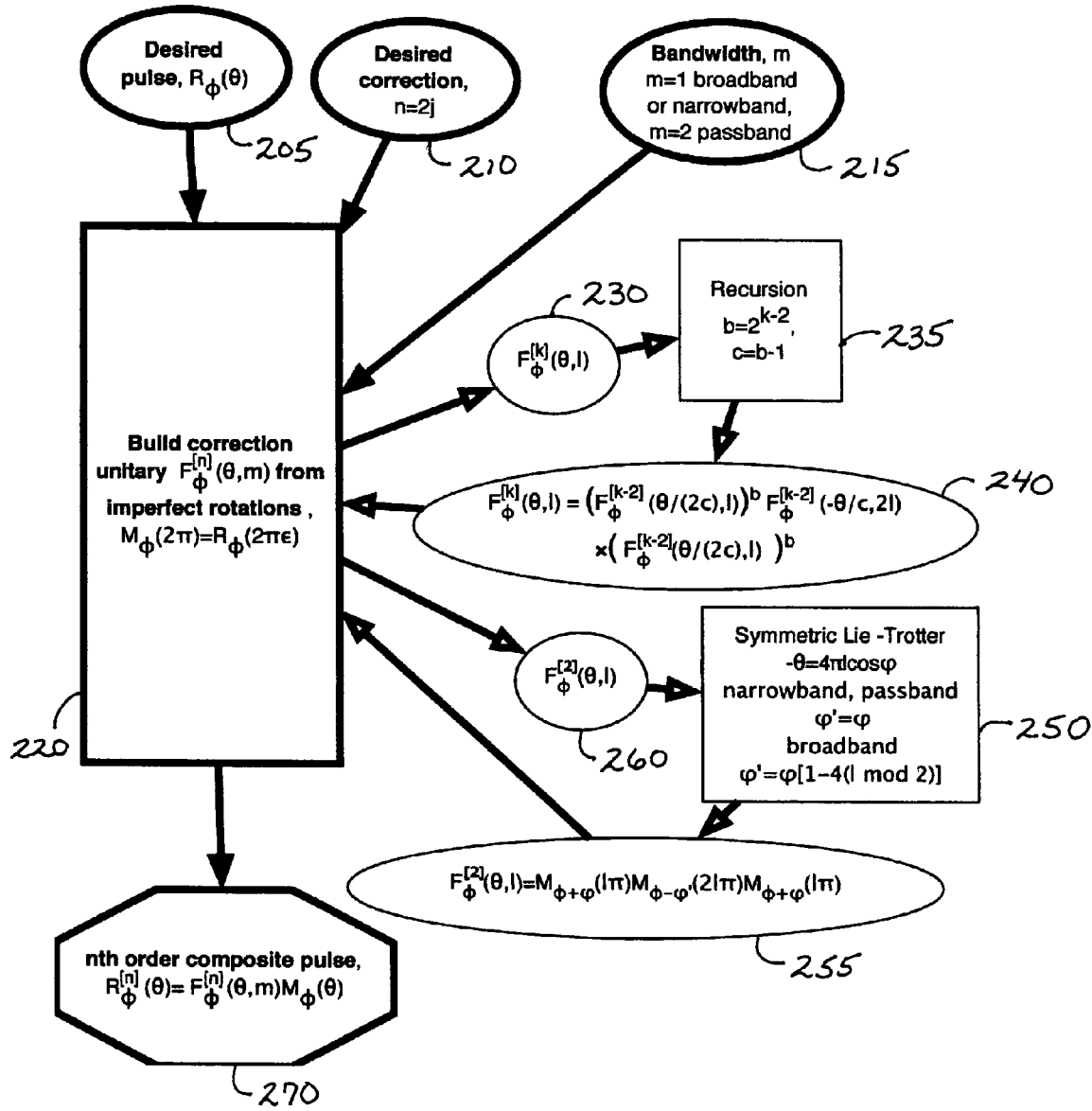
FIG. 2 is a schematic representation of the Trotter-Suzuki embodiment of the present invention.

This embodiment is depicted schematically in FIG. 2. As depicted in FIG. 2, desired pulse 205, desired level of correction 210, and bandwidth 215 are provided as input variables for building 220 correction unitary 230 from imperfect rotations; beginning by recursively 235, 240 constructing in terms of composite pulses with a lower level of correction, and concluding with the base case 260, which is given by a formula 255 which depends on the desired bandwidth 250. This procedure outputs an n th order composite pulse 270.

The second preferred embodiment is called the Solovay-Kitaev (SK) method, as it uses elements of the proof of the Solovay-Kitaev theorem [A. Y. Kitaev, A. H. Shen, and M. N. Vyalyi, Classical and Quantum Computation, vol. 47 of Graduate Studies in Mathematics (American Mathematical Society, Providence, 2002)]. First, note that rotations $U_k(A) = I + A\epsilon^k + O(\epsilon^{k+1})$ can be constructed for arbitrary 2×2 Hermitian matrices A, and $k \geq 1$, recursively. This is done using an observation (from [A. Y. Kitaev, A. H. Shen, and M. N. Vyalyi, Classical and Quantum Computation, vol. 47 of Graduate Studies in Mathematics (American Mathematical Society, Providence, 2002)]) relating the commutator $[A,B] = AB - BA$ to a sequence of operations, $\exp(-iA\epsilon^l)\exp(-iB\epsilon^m)\exp(iA\epsilon^l)\exp(iB\epsilon^m) = \exp([A,B]\epsilon^{l+m}) + O(\epsilon^{l+m+1})$. Thus to generate $U_k(A)$, it suffices to generate $U_{\lceil k/2 \rceil}(B)$ and $U_{\lfloor k/2 \rfloor}(C)$, such that $[B,C] = A$. Choices of integers other than $\lceil k/2 \rceil$ and $\lfloor k/2 \rfloor$ which sum to k are also fine, but less optimal.

Next, a composite pulse sequence $F_n$ for $R_0(\theta)$ is inductively constructed. Note that the first order correction sequence can be written as $F_1 = M_\phi(2\pi)M_{-\phi}(2\pi) = R_0(-\theta\epsilon) + O(\epsilon^2)$ by selecting $4\pi \cos(\phi) = \theta$.

Assuming $F_n = R_0(-\theta\epsilon) - iA_{n+1}\epsilon^{n+1} + O(\epsilon^{n+2})$, a sequence may be constructed to correct for the next order, using $F_{n+1} = U_{n+1}(A_{n+1}) F_n$, where $U_{n+1}(A_{n+1})$ is constructed as above. Iteratively applying this method for $k = 1, \ldots, n$ yields an n th order composite pulse sequence, $F_n M_0(\theta) = R_0^{[n]}(\theta)$, for any n. This embodiment, which appears to be unrelated to previous composite pulse techniques [R. Freeman, Spin Choreography (Spektrum, Oxford, 1997); M. Levitt and R. R. Ernst, J. Magn. Reson. 55, 247 (1983)], provides an efficient mechanism for calculating sequences for specific $\theta$ and $\phi$ but no short analytic description.

Figure 3:
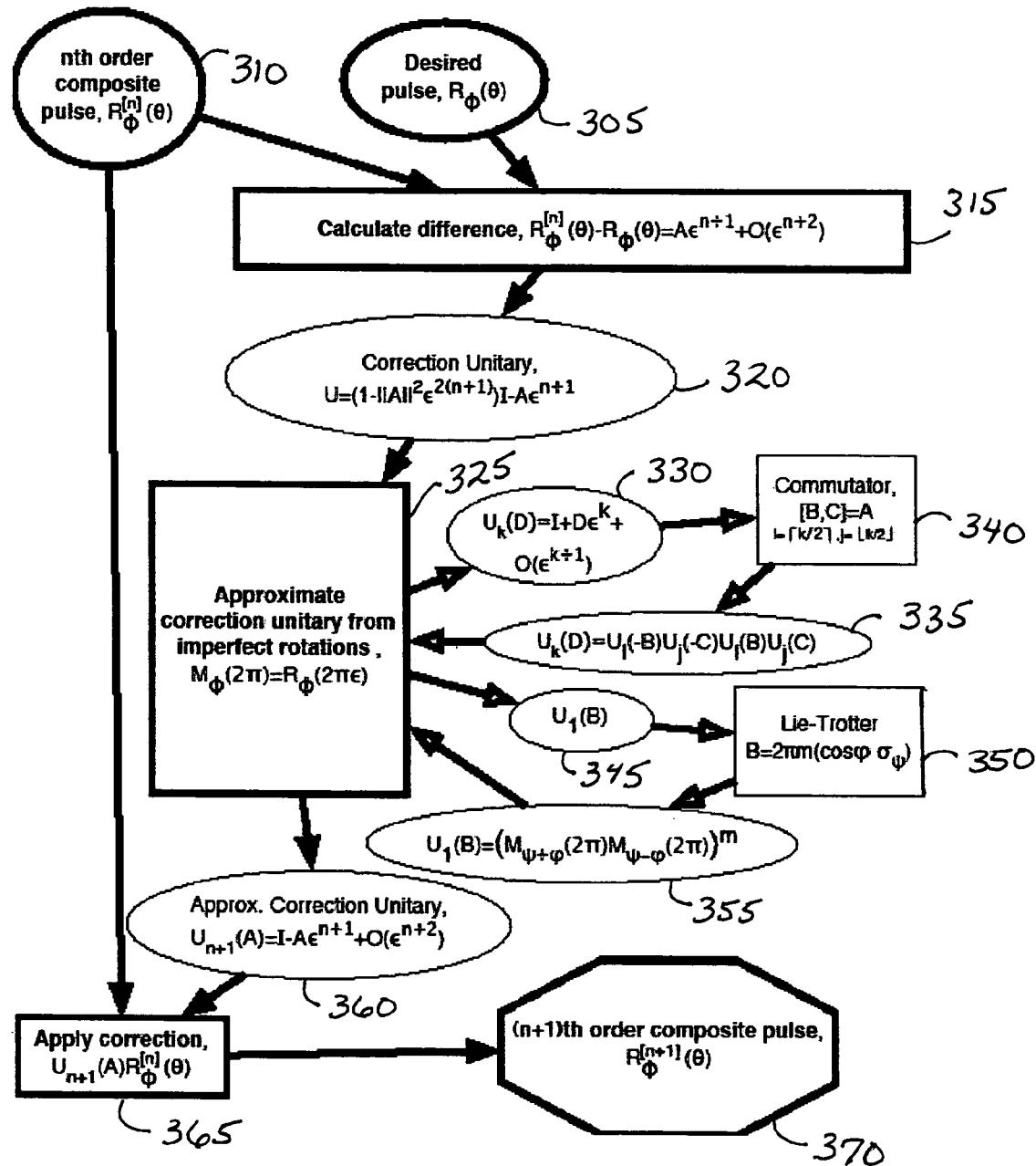
FIG. 3 is a schematic representation of the Solovay-Kitaev embodiment of the present invention.

This embodiment is depicted schematically in FIG. 3. As depicted in FIG. 3, the difference between desired pulse 305 and n th order composite pulse 310 (beginning with n=1 and continuing until n reaches the desired level of correction) is calculated 315 and used to produce the next correction unitary 320. Approximate correction unitary 325 from imperfect rotations is either (for n>1) 330 decomposed into a commutator 340 of rotations which are recursively determined 335, or in the base case (n=1) 345 is determined by application of the TS method 350, 355. Approximate correction unitary 360 is then used to apply correction 365 in order to produce (n+1)th order composite pulse 370.

The TS and SK embodiments are general and apply to a wide variety of errors. Explicit application of the techniques to generate $R_0^{[n]}(\theta)$ sequences for specific n can take advantage of symmetry arguments, composition of techniques, and relax some of the assumptions in order to minimize both the residual error and the sequence length.

First, the TS composite pulses are explicitly written out and connected to the well-known pulse sequences of Wimperis [S. Wimperis, J. Magn. Reson. B 109, 221 (1994)]. Use of the TS formulas that are symmetric under reversal of pulses, i.e. an anagram, is chosen. These formulas remove all even-ordered errors by symmetry, and thus yield only even-order composite pulse sequences. For convenience, the notation $S_1(\phi_1,\phi_2,m)=M_{\phi_1}(m\pi)M_{\phi_2}(2m\pi)M_{\phi_1}(m\pi)$ and $S_n(\phi_1,\phi_2,m)=S_{n-1}(\phi_1,\phi_2,m)^{4^n}S_{n-1}(\phi_1,\phi_2,-2m)S_{n-1}(\phi_1,\phi_2,m)^{4^n}$ is introduced. A series of n order composite pulses P n can now be defined as $$P0 = M_0(\theta)$$

$$P2 = M_{\phi_1}(2\pi)M_{-\phi_1}(4\pi)M_{\phi_1}(2\pi)P0$$

$$P2j = S_j(\phi_j,-\phi_j,2)P0$$

where $$\phi_j = \cos^{-1}-\frac{\theta}{8\pi f_j} \text{ and } f_j = (2^{(2j-1)}-2)f_{j-1}$$

when $f_1=1$. P2 is exactly the passband sequence PB1 described by Wimperis [S. Wimperis, J. Magn. Reson. B 109, 221 (1994)].

Figure 4:
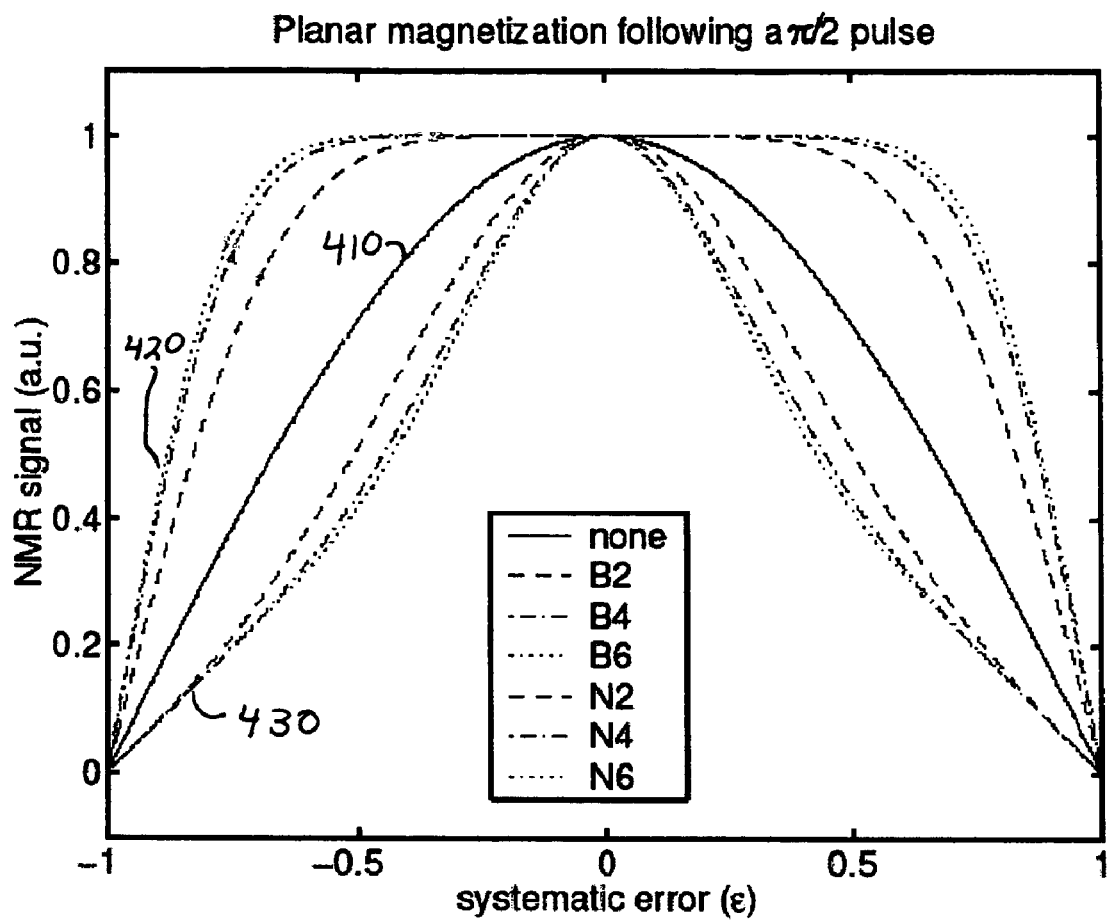
FIG. 4 is a graph depicting a comparison of the narrowband and broadband composite pulse sequences generated by the Trotter-Suzuki method according to one embodiment of the present invention.

FIG. 4 compares the performance of these high-order passband pulse sequences. The Wimperis BB1, PB1, and NB1 sequences are included in this family, and are equivalent to B2, P2, and N2. In FIG. 4, the planar magnetization following A π/2 pulse is shown as a function of NMR signal (au) and systematic error (ε). Solid line 410 is the uncorrected pulse, while the dotted lines above 420 pulse 410 are broadband pulses and those below 430 are narrowband pulses.

Wimperis also proposes a similar broadband sequence, $BB1=S_1(\phi_{B1},3\phi_{B1},1)P0$ where $$\phi_{B1} = \cos^{-1}\left(-\frac{\theta}{4\pi}\right).$$

The broadband sequence corrects over a wider range of ε by minimizing the first order commutator and thus the leading order errors. Furthermore, although BB1 and PB1 appear different when written as imperfect rotations, a transformation to true rotations shows that they have the same form, $$PB1 = M_{\phi_1}(2\pi)M_{-\phi_1}(4\pi)M_{\phi_1}(2\pi)P0$$
$$= R_{\phi_1}(2\pi\varepsilon)R_{-\phi_1}(4\pi\varepsilon)R_{\phi_1}(2\pi\varepsilon)P0$$

$$BB1 = M_{\phi_{B1}}(\pi)M_{3\phi_{B1}}(2\pi)M_{\phi_{B1}}(\pi)P0$$
$$= R_{\phi_{B1}}(\pi\varepsilon)R_{-\phi_{B1}}(2\pi\varepsilon)R_{\phi_{B1}}(\pi\varepsilon)P0.$$

This "toggled" frame suggests a way to create higher-order broadband pulses. One simply takes a higher-order passband sequence and replaces each element $S_1(\phi_j,-\phi_j,m)$ with $S_1(\phi_{Bj},-\phi_{Bj}+4\phi_{Bj}(m/2 \bmod 2), m/2)$ where $\phi_{Bj}$ satisfies the condition $\cos(\phi_{Bj})=2\cos(\phi_j)$. Applying this to P n creates a family of broadband composite pulses, B n.

Similar extensions allow creation of another kind of composite pulse that increase error, so as to perform the desired operation for only a small window of error. Such "narrowband" pulse sequences N n may be obtained starting with a passband sequence, P n, and dividing the angles of the corrective pulses by 2. These higher-order narrowband pulses may be compared with the Wimperis sequence NB1 [S. Wimperis, J. Magn. Reson. B 109, 221 (1994)], as shown in FIG. 4. They may allow a new method of performing magnetic resonance imaging, in which RF inhomogeneity is used to select some region of space.

The SK embodiment yields a third set of n th order composite pulses, SK n, and for concreteness, an explicit formulation of this method is presented. It is convenient to let $$U_{nX}(a) = I - ia^n\frac{X}{2}\varepsilon^n + O(\varepsilon^{n+1}),$$

such that one can then generate $U_{nZ}(\alpha)=M_{90}(-\pi/2)U_{nX}(\alpha)M_{90}(\pi/2)$ and $U_{nY}(\alpha)=M_{45}(\pi/2)U_{nX}(\alpha)M_{45}(-\pi/2)$. The optimal way to generate $U_{nY}$ is to shift the phases, $\phi$, of the underlying $M_\phi(\theta)$ that generate $U_{nX}$ by 90 degrees. Using the first-order rotations $$U_{1X}(a) = M_\phi\left(2\pi\left\lceil\frac{a}{4\pi}\right\rceil\right)M_{-\phi}\left(2\pi\left\lceil\frac{a}{4\pi}\right\rceil\right), \quad (6)$$

where $$\phi = \cos^{-1}\left(a/\left(4\pi\left\lceil\frac{a}{4\pi}\right\rceil\right)\right),$$

as described above, we may recursively construct $U_{nX}(\alpha)=U_{\lfloor n/2\rfloor Y}(\alpha)U_{\lceil n/2\rceil Z}(\alpha)U_{\lfloor n/2\rfloor Y}(-\alpha)U_{\lceil n/2\rceil Z}(-\alpha)$, for any n>1. and any α.

With these definitions, the first order SK composite pulse for $R_0^{[n]}(\theta)$ is simply $$SK1 = U_{1X}(\theta)M_0(\theta) = R_0(\theta) - i\frac{A_2}{2}\varepsilon^2 + O(\varepsilon^3). \quad (7)$$

From the 2×2 matrix $A_2$, the norm $\|A_2\|$ and the planar rotation $R_{A_2}$ that performs $R_{A_2}(-A_2)R_{A_2}^{-1}=\|A_2\|X$ can then be calculated. The second order SK composite pulse is then $$SK2 = M_{A_2}^{-1}U_{2X}(\|A_2\|^{1/2})M_{A_2}SK1 \quad (8)$$

$$= R_0(\theta) - i\frac{A_3}{2}\varepsilon^3 + O(\varepsilon^4) \quad (9)$$

where $M_{A_2}$ is the imperfect rotation corresponding to the perfect rotation $R_{A_2}$. The n th order SK composite pulse family is thus $$SKn = M_{A_n}^{-1} U_{n X}(\|A_n\|^{1/n}) M_{A_n} SK(n-1) \quad (10)$$

$$= R_0(\theta) - i\frac{A_{n+1}}{2}\varepsilon^{n+1} + O(\varepsilon^{n+2}). \quad (11)$$

A nice feature of the SK embodiment is that, when given a composite pulse of order n described by any method, a pulse of order n+1 may be composed. The "pure" SK method SK n is outperformed in terms of both error reduction and pulse number by the TS method B n for $n \leq 4$. Therefore, the SK method is typically applied for orders n>4, using B 4 as the base composite pulse. These pulses are labeled SB n.

Figure 5:
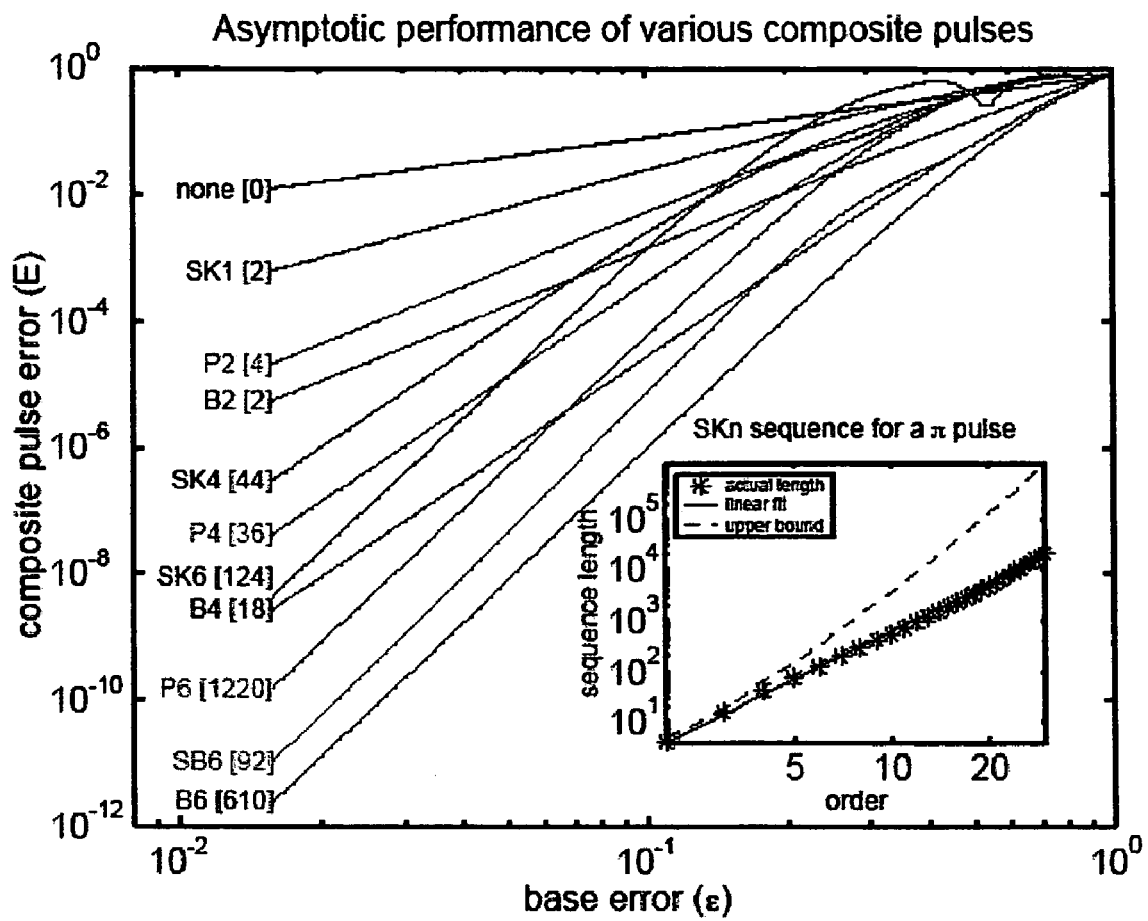
FIG. 5 is a graph depicting composite pulse error, E, as a function of base error, $\epsilon$ for a variety of composite pulse sequences, including composite pulse sequences generated by the Solovay-Kitaev method according to one embodiment of the present invention.

Two important issues with composite pulses are the actual amount of error reduction as a function of pulse error, and the time required to achieve a desired amount of error reduction. These performance metrics are shown in FIG. 5, comparing the SK, broadband, and passband composite pulses for varying error $\epsilon$, and $\phi=0$, and using as the composite pulse error $E = \|R_\phi(\theta) - R_\phi^{[n]}(\theta)\|$. For practical values of error reduction, n<30, the number of $\pi$ pulses required to reduce error to $O(\epsilon^n)$ grows as $\Box n^{3.09}$, which is close to the lower bound of $\Box n^3$ which can be analytically derived.

In FIG. 5, the asymptotic performance of various composite pulses are shown as a function of composite pulse error (E) and base error ($\epsilon$). P n, B n, SK n and SB n are the n th order passband, broadband, SK, and combined B4-SK sequences, respectively. The number in the brackets refers to the number of imperfect $2\pi$ rotations in the correction sequence. Note how pulses of the same order (such as P6, B6, SK6, SB6) have the same slope (asymptotic scaling) for low values of $\epsilon$, but can have widely varying performance when $\epsilon$ is large. The inset plots the scaling of this sequence length with order n for SK n (SB n is very similar) for $n \leq 30$ and compares it with the upper bound of $O(n^3)$.

For a wide range of base errors $\epsilon$, the TS embodiment out-performs the SK embodiment in achieving a low composite pulse error, E. The recursive nature of the TS method builds off elements that remove lower order errors, resulting in a rapid increase of pulse number and a monotonic decrease in effective error at every order for any value of the base error. However, the SK approach is superior to the TS method for applications requiring incredible precision, $E \leq 10^{-12}$, from relatively precise controls, $\epsilon < 10^{-2}$.

Furthermore, the SK method is more efficient at generating higher order pulses than the TS method. We compare this efficiency by counting the number of $2\pi$ imperfect rotations in the sequence. After cancellation of pulse pairs of the form $U^\dagger U$, the TS method P n requires $N(n/2)$ $2\pi$ pulses where $N(n/2)$ is defined by the recursion relation $N(k)=(2^{2k-1}+2)N(k-1)-4$ and $N(1)=4$. The TS method B n requires $N(n/2)/2$ $2\pi$ pulses. In both methods, the pulse length increases rapidly as $O(\exp(n^2))$.

A bound on the length of SK n can be obtained by noting that correcting an $\epsilon^k$ term requires four times as many pulses as correcting an $\epsilon^{k/2}$ term; solving this recurrence yields a cos t of $O(k^2)$. To correct $R_\phi(\theta\epsilon)$ to $O(\epsilon^n)$ requires performing this correction for k=1, ..., n for a total cost of $O(n^3)$ pulses. As mentioned above, this bound applies for practical values of n ($n \leq 30$), even though the magnitude of the pulses to correct $A^k \epsilon^k$ is proportional to $\|A_k\|^{1/k}$, which might be much larger than $2\pi$.

The SK and TS pulse sequences presented here are conceptually simple but may not be optimal when used alone. In an alternate embodiment, new families of composite pulses are developed by integrating ideas from both methods. As an example, the SK method relies on cancellation of error order by order by building up sequences of $2\pi$ pulses. However, there is no reason that the basic unit should be a single pulse. Instead, a sequence may be built from TS (B2)-style pulse triplets, $G(\phi_1)=S_1(\phi_1,3\phi_1,1)$. By using an additional symmetry that $Tr(YG(-\phi_1)G(\phi_1))=0$, the leading order error is guaranteed to be proportional to X at the cost of doubling the pulse sequence. The resulting pulses are of length exp(n) (compared to $\exp(n^2)$ for TS) and are broadband compared to SK sequences.

The present invention demonstrates that it is possible to generate composite pulse sequences that perform arbitrarily accurate rotations using pulses that have a systematic, but unknown, error in rotation angle. These can be constructed with $O(n^3)$ pulses, for $n \leq \approx 30$. For high-precision applications, such as quantum computation, these pulses allow performance of accurate operations even with large errors. Practically, the B4 and B2=BB1 pulse sequences seem most useful, depending on the magnitude of error.

While specific composite pulse sequences for correcting rotation errors are disclosed herein, the present invention may also be applied to correct systematic errors in control phase and frequency. Also, both the TS and SK approaches can be extended to any set of operations that has a subgroup isomorphic to rotations of a spin. For example, Jones has used this isomorphism to create reliable two qubit gates based on an Ising interaction to accuracy $O(\epsilon^3)$ [J. Jones, Phys. Rev. A 67, 012317 (2002)]. Similarly, the present invention can immediately be applied to provide arbitrary accuracy multi-qubit gates. Interestingly, the TS formula can be directly applied to any set of operations, if the operations suffer from proportional systematic timing errors. Therefore, this control method may also be applied to classical systems.

The apparatus and method of the present invention, therefore, provide composite pulses that are both fully compensating and able to correct errors arbitrarily well. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications and substitutions by one of ordinary skill in the art are therefore also considered to be within the scope of the present invention, which is not to be limited except by the claims that follow.

The invention claimed is:

1. A method for transforming, in a quantum computer or nuclear magnetic resonance device, a bare pulse into a fully-compensating composite pulse sequence of arbitrary accuracy, comprising the steps of:
   generating a composite pulse sequence such that, wherein the composite pulse sequence, denoted by $R_\phi^{[n]}(\theta)$, is a sequence of operations $\{M_{\phi_1}(\theta_1), \ldots, M_{\phi_1}(\theta_1)\}$ such that $R_\phi^{[n]}(\theta) = M_{\phi_1}(\theta_1) M_{\phi_2}(\phi_2) \cdots M_{\phi_1}(\theta_l) = R_\phi(\theta) + O(\epsilon^{n+1})$, for unknown error $\epsilon$, $R_\phi(-\theta\epsilon)$ is approximated by a product of operators $R_{\phi_1}(2k_j\pi\epsilon)$; and
   replacing the bare pulse with the generated fully-compensating composite pulse sequence.

2. The method of claim 1, further comprising the steps of: given a set of real numbers $\{p_{jn}\}$, where $$\sum_j p_{jn} = 1,$$

such that for any Hermitian matrix B ($B_{ij}^* = B_{ji}$) and a series of Hermitian matrices $\{A_l\}$, such that $$B = \sum A_l, \text{ then } \exp(-iBt) = \prod_{j,l} \exp(-ip_{jn}A_l t) + O(t^{n+1}),$$

setting $t=\epsilon$ and $B=-(\theta/2)X$,
choosing $A_1 = A_3 = m\pi(X \cos\phi + Y \sin\phi)$ and $A_2 = 2M\pi(X \cos\phi - Y \sin\phi)$, wherein $\phi$ and m fulfill the conditions that $4m\pi \cos\phi = \theta/2$ and $q_{jn} = p_{jn}m$ is an integer;
producing thereby an nth order correction sequence:

$$F_n = \prod_j M_\phi(2\pi q_{jn}) M_{-\phi}(4\pi q_{jn}) M_\phi(2\pi q_{jn})$$

$$= R_0(-\theta\varepsilon) + O(\varepsilon^{n+1})$$

$$= R_0^{[n]}(-\theta\varepsilon); \text{ and}$$

producing thereby an associated nth order composite pulse sequence: $F_n M_0(\theta) = R_0^{[n]}(-\theta\epsilon)R_0(\theta\epsilon)R_0(\theta) = R_0^{[n]}(\theta)$.

3. The method of claim 1, further comprising the steps of recursively constructing rotations $U_k(A) = I + A\epsilon^k + O(\epsilon^{k+1})$ for arbitrary 2×2 Hermitian matrices A, and $k \geq 1$, by relating a commutator $[A,B] = AB - BA$ to a sequence of operations, $\exp(-A\epsilon^l)\exp(-iB\epsilon^m)\exp(iA\epsilon^l)\exp(iB\epsilon^m) = \exp([A,B]\epsilon^{l+m}) + O(\epsilon^{l+m+1})$ generating $U_{\lfloor k/2 \rfloor}(B)$ and $U_{\lfloor k/2 \rfloor}(C)$, such that $[B,C] = A$; and
iteratively constructing an nth order composite pulse sequence, $F_n M_0(\theta) = R_0^{[n]}(\theta)$ for any n by the steps of:
producing a first order correction sequence $F_1 = M_\phi(2\pi)M_{-\phi}(2\pi) = R_0(-\theta\epsilon) + O(\epsilon^2)$ by selecting $4\pi\cos(\phi) = \theta$; and
for each $k=1\ldots n$, performing the steps of:
assuming $F_k = R_0(-\theta\epsilon) - iA_{k+1}\epsilon^{k+1} + O(\epsilon^{k+2})$; and
producing a next order correction sequence $F_{k+1} = U_{k+1}(A_{k+1})F_k$.

4. The method of claim 1, further including the step of:
given an nth order composite pulse sequence generated by any method, constructing a composite pulse sequence of order n+1 by the steps of:
recursively constructing rotations $U_k(A) = I + A\theta^k + O(\epsilon^{k+1})$ for arbitrary 2×2 Hermitian matrices A, and $k \geq 1$, by relating a commutator $[A,B] = AB - BA$ to a sequence of operations, $\exp(-A\epsilon^l)\exp(-B\epsilon^m)\exp(iA\epsilon^l)\exp(iB\epsilon^m) = \exp([A,B]\epsilon^{l+m}) + O(\epsilon^{l+m+1})$, thereby generating $U_{\lfloor k/2 \rfloor}(B)$ and $U_{\lfloor k/2 \rfloor}(C)$, such that $[B,C] = A$; and
inductively constructing composite pulse sequence $F_{n+1}$ for $R_0(\theta)$ by the steps of:
producing a correction sequence $F_{n+1} = U_{n+1}(A_{n+1})F_n$; and
producing a composite pulse sequence of order n+1, $F_{n+1}M_0(\theta) = R_0^{[n+1]}(\theta)$.

5. The method of claim 1, further comprising the step of controlling a qubit gate, a nuclear magnetic resonance device, or a quantum computer with the generated fully-compensating composite pulse sequence.

6. The method of claim 1, wherein the generated fully-compensating composite pulse sequence has a greater error than the bare pulse.

7. A method for correcting pulse control errors of one or more bare pulses in a pulse sequence generated by a quantum computer or nuclear magnetic resonance device, comprising the steps of:
generating, in a quantum computer or nuclear magnetic resonance device, at least one fully-compensating composite pulse sequence of arbitrary accuracy having the properties:
wherein the composite pulse sequence, denoted $R_\phi^{[n]}(\theta)$, is a sequence of operations $\{M_{\phi_1}(\theta_1), \ldots, M_{\phi_l}(\theta_l)\}$ such that $R_\phi^{[n]}(\theta) = M_{\phi_1}(\theta_1)M_{\phi_2}(\theta_2) \cdots M_{\phi_l}(\theta_l) = R_\phi(\theta) + O(\epsilon^{n+1})$, for unknown error $\epsilon$, $R_\phi(-\theta\epsilon)$ is approximated by a product of operators $R_{\phi_1}(2k_1\pi\epsilon)$; and
replacing one or more bare pulses having errors with one or more generated fully-compensating composite pulse sequence to obtain a corrected pulse sequence having fewer errors.

8. The method of claim 7, the composite pulse sequence further having the properties:
given a set of real numbers $\{p_{jn}\}$, where $$\sum_j p_{jn} = 1,$$

such that for any Hermitian matrix B ($B_{ij}^* = B_{ji}$) and a series of Hermitian matrices $\{A_l\}$, such that $B = \Sigma A_l$, $$\text{then } \exp(-iBt) = \prod_{j,l} \exp(-ip_{jn}A_l t) + O(t^{n+1}),$$

$t = \epsilon$ and $B = (\theta/2)X$, $A_1 = A_3 = m\pi(X \cos\phi + Y \sin\phi)$ and $A_2 = 2m\pi(X \cos\phi - Y \sin\phi)$, wherein $\phi$ and m fulfill the conditions that $4m\pi \cos\phi = \theta/2$ and $q_{jn} = p_{jn}m$ is an integer, the nth order correction sequence is $$F_n = \prod_j M_\phi(2\pi q_{jn}) M_{-\phi}(4\pi q_{jn}) M_\phi(2\pi q_{jn})$$

$$= R_0(-\theta\varepsilon) + O(\varepsilon^{n+1}) = R_0^{[n]}(-\theta\varepsilon); \text{ and}$$

the associated nth order composite pulse sequence is $F_n M_0(\theta) = R_0^{[n]}(-\theta\epsilon)R_0(\theta\epsilon)R_0(\theta) = R_0^{[n]}(\theta)$.

9. The method of claim 7, the composite pulse sequence further having the properties:
wherein rotations $U_k(A) = I + A\epsilon^k + O(\epsilon_{k+1})$ for arbitrary 2×2 Hermitian matrices A and $k \geq 1$, are recursively constructed by relating a commutator $[A,B] = AB - BA$ to a sequence of operations, $\exp(-iA\epsilon^l)\exp(-iB\epsilon^m)\exp(iA\epsilon_l)\exp(iB\epsilon^m) = \exp([A,B]\epsilon^{l+m}) + O(\epsilon^{l+m+1})$, thereby generating $U_{\lfloor k/2 \rfloor}(B)$ and $U_{\lfloor k/2 \rfloor}(C)$, such that $[B,C] = A$, an nth order composite pulse sequence, $F_n M_0(\theta) = R_0^{[n]}(\theta)$, for any n, having:
a first order correction sequence $F_1 = M_\phi(2\pi)M_{-\phi}(2\pi) = R_0(-\theta\epsilon) + O(\epsilon^2)$, wherein $4\pi \cos(\phi) = \theta$; and
for each $k = 1 \ldots n$, wherein
$F_k = R_0(\theta\epsilon) - iA_{k+1}\epsilon^{k+1} + O(\epsilon^{k+2})$, a next order correction sequence
$F_{k+1} = U_{k+1}(A_{k+1})F_k$.

10. The method of claim 7, further comprising the step of controlling a qubit gate, a nuclear magnetic resonance device, or a quantum computer with the corrected pulse sequence.

11. The method of claim 7, further comprising the step of controlling the amount of reduction of error in the corrected pulse sequence by controlling the length of the generated fully-compensating composite pulse sequence.

12. A computer-readable storage medium, the medium being characterized in that:
the computer-readable storage medium contains code which, when executed in a processor, transforms a bare pulse into a fully-compensating composite pulse sequence of arbitrary accuracy by the steps of:
generating, in a quantum computer or nuclear magnetic resonance device, a fully-compensating composite pulse sequence of arbitrary accuracy,
wherein the composite pulse sequence, denoted by $R_\phi^{[n]}(\theta)$, is a sequence of operations $\{M_{\phi_1}(\theta_1), \ldots, M_{\phi_l}(\theta_l)\}$ such that $R_\phi^{[n]}(\theta)=M_{\phi_1}(\theta_1)M_{\phi_1}(\theta_2) \ldots M_{\phi_l}(\theta_l)=R_\phi(\theta)+O(\epsilon^{n+1})$, for unknown error $\epsilon$, $R_\phi(-\theta\epsilon)$ is approximated by a product of operators $R_{\phi_1}(2k\pi\epsilon)$; and
replacing the bare pulse with the generated fully-compensating composite pulse sequence.

13. The computer-readable storage medium of claim 12, the medium further containing code which, when executed in a processor, performs the steps of:
given a set of real numbers $\{p_{jn}\}$, where $$\sum_j p_{jn} = 1,$$

such that for any Hermitian matrix $B(B_{ij}^*=B_{ji})$ and a series of Hermitian matrices $\{A_l\}$, such that $B=\Sigma A_l$, then $$\exp(-iBt) = \prod_{j,l} \exp(-ip_{jn}A_l t) + O(t^{n+1}),$$

setting $t=\epsilon$ and $B=-(\theta/2)X$.
choosing $A_1=A_3=m\pi(X\cos\phi+Y\sin\phi)$ and $A_2=2m\pi(X\cos\phi-Y\sin\phi)$, wherein $\phi$ and $m$ fulfill the conditions that $4m\pi\cos\phi=\theta/2$ and $q_{jn}=p_{jn}m$ is an integer;
producing thereby an nth order correction sequence:

$$F_n = \prod_j M_\phi(2\pi q_{jn})M_{-\phi}(4\pi q_{jn})M_\phi(2\pi q_{jn})$$
$$= R_0(-\theta\varepsilon) + O(\varepsilon^{n+1})$$
$$= R_0^{[n]}(-\theta\varepsilon); \text{ and}$$

producing thereby an associated nth order composite pulse sequence:

$$F_n M_0(\theta)=R_0^{[n]}(-\theta\epsilon)R_0(\theta\epsilon)R_0(\theta)=R_0^{[n]}(\theta).$$

14. The computer-readable storage medium of claim 12, the medium further containing code which, when executed in a processor, performs the steps of:
recursively constructing rotations $U_k(A)=I+A\epsilon^k+O(\epsilon^{k+1})$ for arbitrary 2×2 Hermitian matrices $A$, and $k\geq 1$, by relating a commutator $[A,B]=AB-BA$ to a sequence of operations, $\exp(-iA\epsilon^l)\exp(-iB\epsilon^m)\exp(iA\epsilon^l)\exp(iB\epsilon^m)=$ $\exp([A,B]\epsilon^{l+m})+O(\epsilon^{l+m+1})$, thereby generating $U_{\lceil k/2 \rceil}(B)$ and $U_{\lfloor k/2 \rfloor}(C)$, such that $[B,C]=A$; and
iteratively constructing an nth order composite pulse sequence, $F_n M_0(\theta)=R_0^{[n]}(\theta)$ for any n by the steps of:
producing a first order correction sequence $F_1=M_\phi(2\pi)$ $M_{-\phi}(2\pi)=R_0(-\theta\epsilon)+O(\epsilon^2)$ by selecting $4\pi\cos(\phi)=\theta$; and
for each $k=1 \ldots n$, performing the steps of:
assuming $F_k=R_0(-\theta\epsilon)-iA_{k+1}\epsilon^{k+1}+O(\epsilon^{k+2})$; and
producing a next order correction sequence $F_{k+1}=U_{k+1}(A_{k+1})F_k$.

15. A computer-readable storage medium, the medium being characterized in that:
the computer-readable storage medium contains code which, when executed in a processor, performs a method for correcting pulse control errors of one or more bare pulses in a pulse sequence, comprising the steps of:
generating at least one fully-compensating composite pulse sequence of arbitrary accuracy having the properties:
wherein the composite pulse sequence, denoted $R_\phi^{[n]}(\theta)$, is a sequence of operations $\{M_{\phi_1}(\theta_1), \ldots, M_{\phi_l}(\theta_l)\}$ such that $R_\phi^{[n]}(\theta)=M_{\phi_1}(\theta_1)M_{\phi_1}(\theta_2) \ldots M_{\phi_l}(\theta_1)=R_\phi(\theta)+O(\epsilon^{n+1})$, for unknown error $\epsilon$, $R_\phi(-\theta\epsilon)$ is approximated by a product of operators $R_{\phi_1}(2K_1\pi\epsilon)$; and
replacing one or more bare pulses having errors with one or more generated fully-compensating composite pulse sequence to obtain a corrected pulse sequence having fewer errors.

16. The computer-readable storage medium of claim 15, the medium further containing code which, when executed in a processor, performs the steps of:
generating a composite pulse sequence further having the properties:
given a set of real numbers $\{p_{jn}\}$, where $$\sum_j p_{jn} = 1,$$

such that for any Hermitian matrix $B(B_{ij}^*=B_{ji})$ and a series of Hermitian matrices $\{A_l\}$, such that $B=\Sigma A_l$, then $$\exp(-iBt) = \prod_{j,l} \exp(-ip_{jn}A_l t) + O(t^{n+1}),$$

$t=\epsilon$ and $B=-(\theta/2)X$, $A_1=A_3=m\pi(X\cos\phi+Y\sin\phi)$ and $A_2=2m\pi(X\cos\phi-Y\sin\phi)$, wherein $\phi$ and $m$ fulfill the conditions that $4m\pi\cos\phi=\theta/2$ and $q_{jn}=p_{jn}m$ is an integer, the nth order correction sequence is $$F_n = \prod_j M_\phi(2\pi q_{jn})M_{-\phi}(4\pi q_{jn})M_\phi(2\pi q_{jn})$$
$$= R_0(-\theta\varepsilon) + O(\varepsilon^{n+1}) = R_0^{[n]}(-\theta\varepsilon) \text{ and}$$

the associated nth order composite pulse sequence is $$F_n M_0(\theta)=R_0^{[n]}(-\theta\epsilon)R_0(\theta\epsilon)R_0(\theta)=R_0^{[n]}(\theta).$$

17. The computer-readable storage medium of claim 15, the medium further containing code which, when executed in a processor, performs the steps of:

generating a composite pulse sequence further having the properties:
  wherein rotations $U_k(A)=I+A\epsilon^k+O(\epsilon^{k+1})$ for arbitrary 2×2 Hermitian matrices A, and $k \geq 1$, are recursively constructed by relating a commutator $[A,B]=AB-BA$ to a sequence of operations, $\exp(-iA\epsilon^l)\exp(-iB\epsilon^m)\exp(iA\epsilon_l)\exp(iB\epsilon^m)=\exp([A,B]\epsilon^{l+m})+O(\epsilon^{l+m+1})$, thereby generating $U_{\lceil k/2 \rceil}(B)$ and $U_{\lfloor k/2 \rfloor}(C)$, such that $[B,C]=A$, an nth order composite pulse sequence, $F_n M_0(\theta) R_0^{[n]}(\theta)$, for any n, having:
    a first order correction sequence $F_1=M_\phi(2\pi)M_{-\phi}(2\pi)=R_0(-\theta\epsilon)+O(\epsilon^2)$, wherein $4\pi \cos(\phi)=\theta$; and
    for each k=1 . . . n, wherein $F_k=R_0(-\theta\epsilon)-iA_{k+1}\epsilon^{k+1}+O(\epsilon^{k+2})$, a next order correction sequence $F_{k+1}=U_{k+1}(A_{k+1})F_k$.

18. An apparatus for transforming a bare pulse into a fully-compensating composite pulse sequence of arbitrary accuracy, comprising:
  composite pulse generator for generating a composite pulse sequence such that, wherein the composite pulse sequence, denoted by $R_\phi^{[n]}(\theta)$, is a sequence of operations $\{M_{\phi_1}(\theta_1), \ldots, M_{\phi_l}(\theta_l)\}$ such that $R_\phi^{[n]}(\theta)=M_{\phi_1}(\theta_1)M_{\phi_2}(\theta_2)\ldots M_{\phi_1}(\theta_1)=R_\phi(\theta)+O(\epsilon^{n+1})$, for unknown error $\epsilon$, $R_\phi(-\theta\epsilon)$ is approximated by a product of operators $R_{\phi_i}(2k_i\pi\epsilon)$; and
  compensator for replacing the bare pulse with the generated fully-compensating composite pulse sequence of arbitrary accuracy.

19. The apparatus of claim 18, the composite pulse generator further performing the steps of:
  given a set of real numbers $\{p_{jn}\}$, where $$\sum_j p_{jn} = 1,$$

such that for any Hermitian matrix B ($B_{ij}^*=B_{ji}$) and a series of Hermitian matrices $\{A_l\}$, such that $B=\Sigma A_l$, then $$\exp(-iBt) = \prod_{j,l} \exp(-ip_{jn}A_l t) + O(t^{n+1}),$$

setting $t=\epsilon$ and $B=-(\theta/2)X$,
  choosing $A_1=A_3=m\pi(X \cos \phi + Y \sin \phi)$ and $A_2=2m\pi(X \cos \phi - Y \sin \phi)$, wherein $\phi$ and m fulfill the conditions that $4m\pi \cos = \theta/2$ and $q_{jn}=p_{jn}m$ is an integer;
  producing thereby an nth order correction sequence:

$$F_n = \prod_j M_\phi(2\pi q_{jn})M_{-\phi}(4\pi q_{jn})M_\phi(2\pi q_{jn})$$
$$= R_0(-\theta\varepsilon) + O(\varepsilon^{n+1}) = R_0^{[n]}(-\theta\varepsilon); \text{ and}$$

producing thereby an associated nth order composite pulse sequence:

$$F_n M_0(\theta)=R_0^{[n]}(-\theta\epsilon)R_0(\theta\epsilon)R_0(\theta)=R_0^{[n]}(\theta).$$

20. The apparatus of claim 18, the composite pulse generator further performing the steps of:
  recursively constructing rotations $U_k(A)=I+A\epsilon^k+O(\epsilon^{k+1})$ for arbitrary 2×2 Hermitian matrices A, and $k \geq 1$, by relating a commutator $[A,B]=AB-BA$ to a sequence of operations, $\exp(-iA\epsilon^l)\exp(-iB\epsilon^m)\exp(iA\epsilon_1)\exp(iB\epsilon^m)=\exp([A,B]\epsilon^{l+m})+O(\epsilon^{l+m+1})$, thereby generating $U_{\lceil k/2 \rceil}(B)$ and $U_{\lfloor k/2 \rfloor}(C)$, such that $[B,C]=A$; and
  iteratively constructing an nth order composite pulse sequence, $F_n M_0(\theta)=R_0^{[n]}(\theta)$ for any n by the steps of:
    producing a first order correction sequence $F_1=M_\phi(2\pi)M_{-\phi}(2\pi)=R_0(-\theta\epsilon)+O(\epsilon^2)$ by selecting $4\pi \cos(\phi)=\theta$; and
    for each k=1 . . . n, performing the steps of:
      assuming $F_k=R_0(-\theta\epsilon)-iA_{k+1}\epsilon^{k+1}+O(\epsilon^{k+2})$; and producing a next order correction sequence $F_{k+1}=U_{k+1}(A_{k+1})F_k$.

21. The apparatus of claim 18, the composite pulse generator further performing the steps of:
  given an nth order composite pulse sequence generated by any method, constructing a composite pulse sequence of order n+1 by the steps of:
    recursively constructing rotations $U_k(A)=I+A\epsilon^k+O(\epsilon^{k+1})$ for arbitrary 2×2 Hermitian matrices A, and $k \geq 1$, by relating a commutator $[A,B]=AB-BA$ to a sequence of operations, $\exp(-iA\epsilon^l)\exp(-iB\epsilon^m)\exp(iA\epsilon_l)\exp(iB\epsilon^m)=\exp([A,B]\epsilon^{l+m})+O(\epsilon^{l+m+1})$, thereby generating $U_{\lceil k/2 \rceil}(B)$ and $U_{\lfloor k/2 \rfloor}(C)$, such that $[B,C]=A$; and
    inductively constructing composite pulse sequence $F_{n+1}$ for $R_0(\theta)$ by the steps of:
      producing a correction sequence $F_{n+1}=U_{n+1}(A_{n+1})F_n$; and
      producing a composite pulse sequence of order n+1, $$F_{n+1}M_0(\theta)=R_0^{[n+1]}(\theta).$$

22. An apparatus for correcting pulse control errors of one or more bare pulses in a pulse sequence, comprising:
  composite pulse generator for generating at least one fully-compensating composite pulse sequence of arbitrary accuracy having the properties:
    wherein the composite pulse sequence, denoted $R_\phi^{[n]}(\theta)$, is a sequence of operations $\{M_{\phi_1}(\theta_1), \ldots, M_{\phi_1}(\theta_1)\}$ such that $R_\phi^{[n]}(\theta)=M_{\phi_1}(\theta_1)M_{\phi_1}(\theta_2)\ldots M_{\phi_1}(\theta_1)=R_\phi(\theta)+O(\epsilon^{n+1})$, for unknown error $\epsilon$, $R_\phi(-\theta\epsilon)$ is approximated by a product of operators $R_{\phi_i}(2k_i\pi\epsilon)$; and
  compensator for replacing one or more bare pulses having errors with one or more generated fully-compensating composite pulse sequence to obtain a corrected pulse sequence having fewer errors.

23. The apparatus of claim 22, the composite pulse sequence further having the properties:
  given a set of real numbers $\{p_{jn}\}$, where $$\sum_j p_{jn} = 1,$$

such that for any Hermitian matrix B ($B_{ij}^*=B_{ji}$) and a series of Hermitian matrices $\{A_l\}$, such that $B=\Sigma A_l$, then $$\exp(-iBt) = \prod_{j,l} \exp(-ip_{jn}A_l t) + O(t^{n+1}),$$

$t=\epsilon$ and $B=-(\theta/2)X$, $A_1=A_3=m\pi(X \cos \phi + Y \sin \phi)$ and $A_2=2m\pi(X \cos \phi - Y \sin \phi)$, wherein $\phi$ and m fulfill the conditions that $4m\pi \cos \phi=\theta/2$ and $q_{jn}=p_{jn}m$ is an integer, the nth order correction sequence is $$F_n = \prod_j M_\phi(2\pi q_{jn}) M_{-\phi}(4\pi q_{jn}) M_\phi(2\pi q_{jn})$$
$$= R_0(-\theta\varepsilon) + O(\varepsilon^{n+1}) = R_0^{[n]}(-\theta\varepsilon) \text{ and}$$

the associated nth order composite pulse sequence is $F_n M_0(\theta) = R_0^{[n]}(-\theta\epsilon) R_0(\theta\epsilon) R_0(\theta) = R_0^{[n]}(\theta)$.

24. The apparatus of claim 22, the generated composite pulse sequence further having the properties:

wherein rotations $U_k(A) = I + A\epsilon^k + O(\epsilon^{k+1})$ for arbitrary 2×2 Hermitian matrices A, and $k \geq 1$, are recursively constructed by relating a commutator $[A,B] = AB - BA$ to a sequence of operations, $\exp(-iA\epsilon^l)\exp(-iB\epsilon^m)\exp(iA\epsilon^l)\exp(iB\epsilon^m) = \exp([A,B]\epsilon^{l+m}) + O(\epsilon^{l+m+1})$, thereby generating $U_{\lfloor k/2 \rfloor}(B)$ and $U_{\lfloor k/2 \rfloor}(C)$, such that $[B,C] = A$; an nth order composite pulse sequence, $F_n M_0(\theta) = R_0^{[n]}(\theta)$, for any n, having:

a first order correction sequence $F_1 = M_\phi(2\pi) M_{-\phi}(2\pi) = R_0(-\theta\epsilon) + O(\epsilon^2)$, wherein $4\pi \cos(\phi) = \theta$, and for each k=1 . . . n, wherein $F_k = R_0(-\theta\epsilon) - iA_{k+1}\epsilon^{k+1} + (\epsilon^{k+2})$, a next order correction sequence $F_{k+1} = U_{k+1}(A_{k+1}) F_k$.

* * * * *